Oct. 23, 1923.

C. W. IRWIN ET AL 1,471,608

PRESS

Filed Feb. 13, 1922  2 Sheets-Sheet 1

Inventors
CLIFTON W. IRWIN & NICHOLAS V. D. BROCK

Lyon & Lyon
Attorneys

Oct. 23, 1923.
C. W. IRWIN ET AL
1,471,608
PRESS
Filed Feb. 13, 1922   2 Sheets-Sheet 2
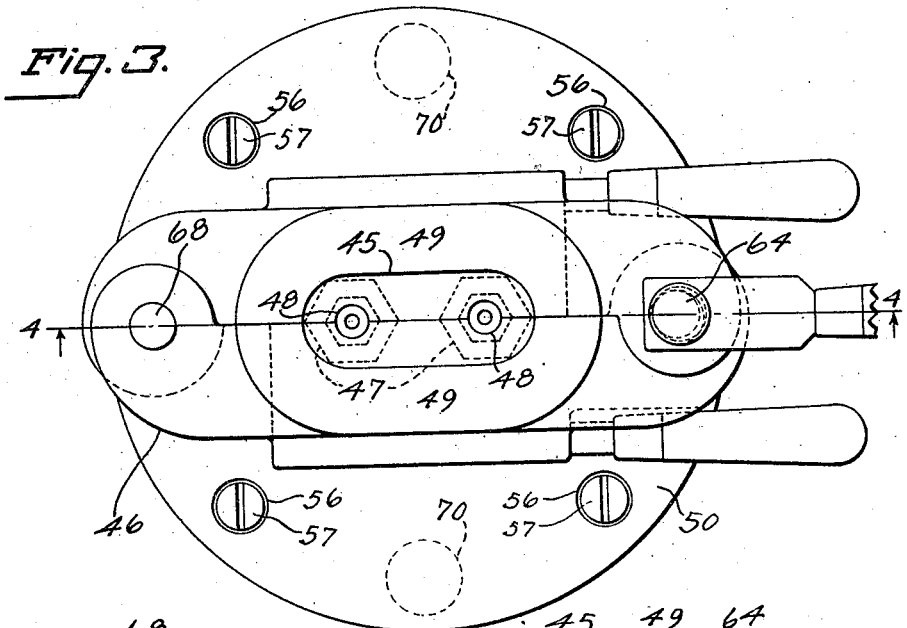
Fig. 3.
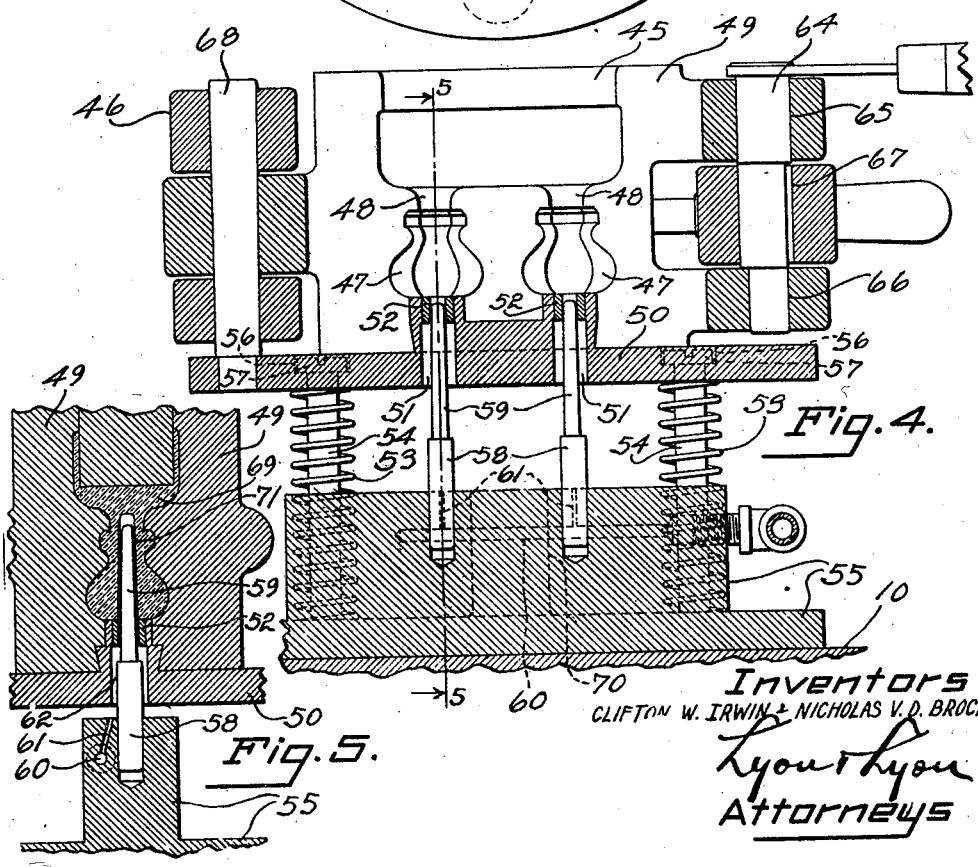
Fig. 4.
Fig. 5.
Inventors
CLIFTON W. IRWIN & NICHOLAS V. D. BROCK
Lyon & Lyon
Attorneys Patented Oct. 23, 1923.

1,471,608

UNITED STATES PATENT OFFICE.

CLIFTON W. IRWIN, OF LOS ANGELES, AND NICHOLAS V. D. BROCK, OF SANTA ANA, CALIFORNIA; SAID IRWIN ASSIGNOR TO SAID BROCK.

PRESS.

Application filed February 13, 1922. Serial No. 536,039.

*To all whom it may concern:*

Be it known that we, CLIFTON W. IRWIN, a citizen of the United States, residing at Los Angeles, in the county of Los Angeles and State of California, and NICHOLAS V. D. BROCK, a citizen of the United States, residing at Santa Ana, in the county of Orange and State of California, have invented a new and useful Press, of which the following is a specification.

This invention relates to an apparatus of the character employed in die casting such articles, for example, as glass door knobs, and an important object of the invention is to increase the output of the individual molds.

Another object is to provide an automatically cooled pin in each of the molds so that the speed of operation can be increased.

Another object is to effect the production of knobs and other objects in a split or sectional mold without a seam showing on the outer end of the knob.

The accompanying drawings illustrate the invention:

Fig. 3 is an enlarged plan view of one of the molds, the parts thereof being in the closed position.

Fig. 4 is a sectional elevation on the line indicated by 4—4, Fig. 3, a fragment of the rotary table also being shown.

Fig. 5 is a fragmental sectional elevation on the line indicated by 5—5, Figure 4.

Figure 1:
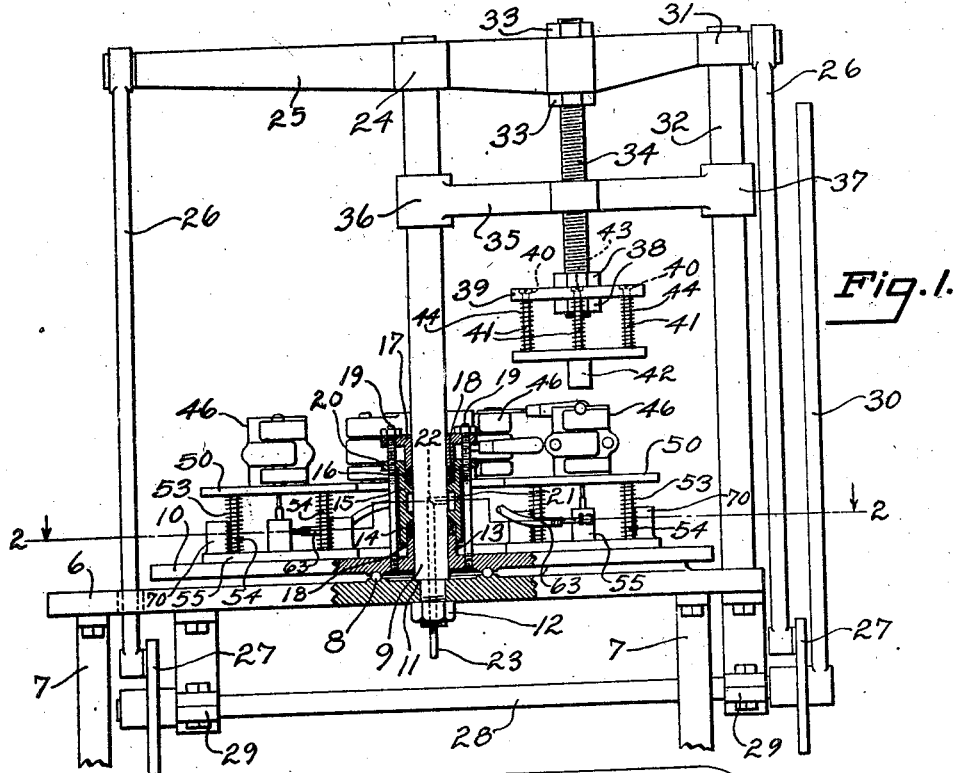
Figure 1 is a side elevation, partly in section of an apparatus built in accordance with the provisions of this invention, the stuffing box, table bearing and thrust bearing being shown in section and the supporting legs being partly broken away.
Figure 2:
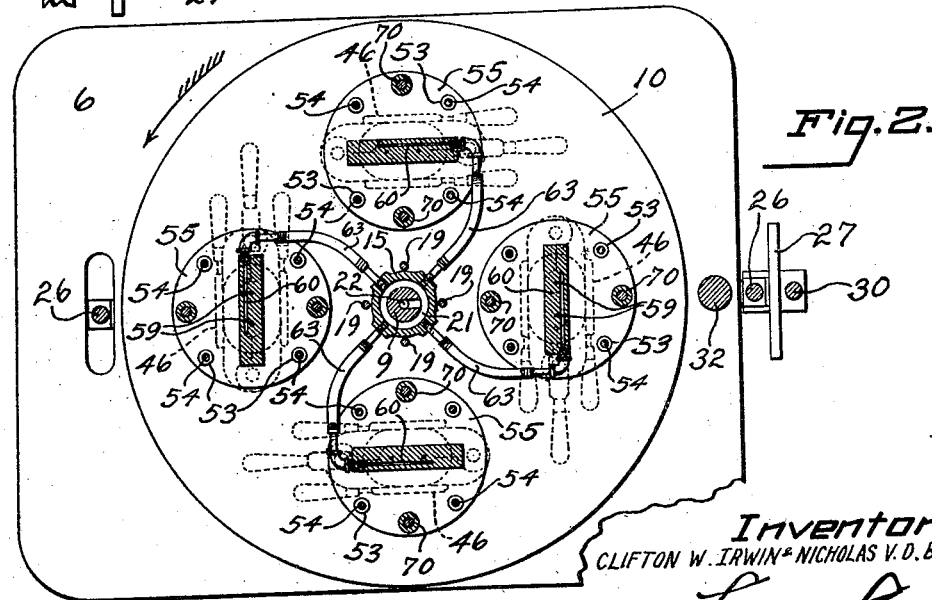
Fig. 2 is a plan view partly in section on the irregular line indicated by 2—2, Fig. 1, a corner of the support being broken away.

There is provided a support 6 mounted on legs 7, which are but fragmentarily shown in Fig. 1 of the drawings. Rotatively mounted on the support 6 by an anti-friction thrust bearing 8 and a vertical stationary shaft 9 is a rotary table 10. The shaft 9 is provided with a shoulder 11 which seats upon the support 6, and the shaft projects through the support and is provided thereunderneath with a nut 12 to securely anchor the lower end of the shaft in the support.

The hub 13 of the table 10 projects into the lower chamber 14 of a stuffing box 15 which is also provided with an upper chamber 16 closed by a gland 17. The chambers 14, 16 are provided with packing 18 and said packing is suitably compressed by bolts 19 which connect the gland 17 with the table 10 and which are also screw-threaded through a flange 20 of the stuffing box 15, so that the gland can be forced into the chamber 16 and the stuffing box can be forced toward the hub 13.

The stuffing box 15 is provided between the chambers 14, 16 with a fluid chamber 21 which communicates with one end of a duct 22 formed in the shaft 9. The other end of the duct 22 terminates at the lower end of the shaft 9 and communicates with a tube 23 adapted to be connected to any suitable compressed air supply.

The upper end of the shaft 9 is engaged by a bearing 24 of a cross head 25. On the opposite ends of the cross head 25 are journaled the upper ends of connecting rods 26. The lower ends of the connecting rods 26 are connected to crank arms 27 secured to a rock shaft 28 which is journaled in bearings 29 secured to the underface of the support 6. Any suitable means may be provided for rocking the shaft 28 and, in this instance, said shaft is provided for this purpose with a lever arm 30 adapted to be manually operated.

The cross head 25 is provided with a second bearing 31 adapted to slide on a standard 32. Thus when the lever arm 30 is operated the cross head 25 is caused to slide on the shaft 9 and standard 32.

Adjustably connected by nuts 33 to the cross head 25 between the shaft 9 and standard 32 is a plunger stem 34 which is screw-threaded through a second cross head 35. The cross head 35 is provided at its opposite ends with bearings 36, 37, which slidably engage the shaft 9 and standard 32, respectively. Adjustably connected with the stem 34 by nuts 38 is a flange 39 provided with counter-sunk holes 40 to accommodate the head ends of headed guide studs 41 which are mounted on a plunger 42. The heads 43 of the studs 41 are larger than the least diameter of the holes 40 so as to limit movement of the flange 39 away from the plunger 42. On the studs 41 between the flange 39 and plunger 42 are coil springs 44 which yieldingly hold the plunger 42 against upward movement. The operation of the cross head 24, in the manner described above, produces operation of the plunger 42.

When the plunger 42 descends, it enters the pouring recess 45 in a split mold 46. In the instance shown in the drawings there are four such molds mounted on the table 10 and they are alike and therefore but one will be described.

Below the recess 45 of the mold 46 are the molding cavities 47. These cavities 47, of course, may be of any desired number and shape and, in the instance shown in the drawings, said cavities are shaped to form door knobs. The cavities 47 communicate with the recess 45 through holes 48. The bottom of the cavities 47 is independent of the mold sections 49, in which the cavities are formed, and said bottom comprises a perforate member 50. The perforations are indicated at 51 and said perforations are preferably provided with bushings 52. The bottom member 50 is yieldingly mounted on coil springs 53 which surround guide posts 54 mounted in a base 55 that in turn is secured by any suitable means, not shown, upon the table 10. The posts 54 pass through counter-sunk holes 56 in the member 50 and are provided with heads 57 of larger diameter than the least diameter of said holes. The heads 57 serve to limit movement of the member 50 away from the base 55 produced by expansion of the springs 53.

Mounted in and projecting above the upper face of the base 55 are pins 58 tapered, as indicated at 59, and having their upper ends normally positioned within the bushings 52 when the member 50 and the parts mounted thereon are in the upper position indicated in Figure 4.

Adjacent each of the base ends of the pins 58 is a duct 60 having branches 61 and formed in the base 55. The branches 61 are directed aslant toward the pins 58 and terminate at the upper face of the base 55 close to the pins 58. The perforations 51 are sufficiently large to provied an annular passage 62 for a cooling fluid when the member 50 is in the lower position indicated in Figure 5.

Tubing, indicated at 63, connects the duct 60 with the air chamber 21 so that whether the table 10 is rotating or not the cooling fluid will be supplied to the duct branches 61. Since there are four molds 46, there are provided four tubes 63, one for each of the molds, and all of the tubes 63 communicates with the air chamber 21.

Suitable means are provided for locking the mold sections 49 in closed position and, in this instance, a detachable eccentric key 64 of well known construction in this art is employed for this purpose, said key engaging holes 65, 66, in one of the mold members and a hole 67 in the other mold member, and all of said holes being in axial alinement when the sections are in closed position. The mold sections 49 are hingedly connected by a pin 68, which is mounted in and projects above the member 50.

For the purpose of describing the operation of the invention, it may be assumed that glass door knobs are to be cast in the molds 46. One of the molds will be brought to position to receive molten glass in a manner well understood in this art. The table 10 will then be turned manually or otherwise to bring the next succeeding mold in position to receive molten glass. The glass is poured into the successive molds, preferably immediately before the molds pass to position beneath the plunger 42.

The lever 30 is then operated to lower the plunger 42 into the recess 45 of the mold that has been filled and moved to position beneath the plunger. The plunger compacts the molten glass 69 and, as it descends further, forces the mold 46 downwardly against the expansive force of the springs 53 to cause the pins 59 to penetrate the molten glass 69. The penetration of the pins 58 into the molten glass is limited by abutments 70 on the base 55 engaging the member 50 when the mold 46 descends. It will be readily understood that the molten glass heats the pins 59 and that the fluid flowing from the duct 60 is for the purpose of cooling the pins. Heretofore the pins have been cooled by causing air to blow on them through the mold cavities after the knobs or other product of the molds have been discharged therefrom. It, of course, requires a certain length of time to effect the cooling sufficiently to prevent too great heating and consequent softening of the pins, that otherwise would result by the repeated exposure of the pins to the molten glass at too close intervals, and thus by the old method a large part of the cycle of operation, during which the knobs were withdrawn from the pins and discharged from the mold, passed without the cooling jet being in action. It will be seen by this construction that the air or other cooling fluid blows upon the lower portions of the pins continuously and that as soon as the mold rises sufficiently to cause the knobs to be withdrawn slightly from the pins, as indicated in Fig. 5, because of the taper of the pins a passage will be created between the pins and the cast knobs so that the cooling fluid can blow upwardly into the recesses 71 produced by the pins and effect immediate cooling of the upper portions of the pins. The cooling jets blow upon the upper portions of the pins at all times during the operation of the machine excepting when the molten glass is forced downwardly around the pins. Thus quicker cooling of the pins is effected than by the old method above described since cooling jets are directed upon the pin during the relative motion between the pins and mold of this machine. The air injected into the recesses 71 in the knobs left by the pins 59 also aids in cooling the knobs, thus causing them to contract so that they will free themselves from the mold as soon as the mold is opened.

We claim:

1. In a press, a mold having a molding cavity and having a perforation communicating with the cavity through the bottom of the cavity, a pin in alinement with the perforation, means to produce relative movement between the pin and mold sections to cause the pin to project into the cavity, and means adjacent the pin to direct a cooling jet upon the pin during the relative motion between the pin and mold.

2. In a press, a rotatably mounted table, molds mounted on the table and provided with cavities and with perforations communicating with the cavities, pins mounted on the table in axial alinement with the perforations and extending upwards to cooperate with the molds, means to produce relative movement between the pins and molds, and means to direct cooling jets upon the pins while the table is rotating.

Signed at Los Angeles, California this 4th day of February 1922.

CLIFTON W. IRWIN.
NICHOLAS V. D. BROCK.

Witnesses:
GEORGE H. HILES,
L. BELLE WEAVER.